(12) United States Patent
Guo et al.

(10) Patent No.: US 10,684,946 B2
(45) Date of Patent: Jun. 16, 2020

(54) METHOD AND DEVICE FOR ON-CHIP REPETITIVE ADDRESSING

(71) Applicant: Institute of Computing Technology, Chinese Academy of Sciences, Beijing (CN)

(72) Inventors: Qi Guo, Beijing (CN); Tianshi Chen, Beijing (CN); Yunji Chen, Beijing (CN)

(73) Assignee: INSTITUTE OF COMPUTING TECHNOLOGY, CHINESE ACADEMY OF SCIENCE, Beijing (CN)

( * ) Notice: Subject to any disclaimer, the term of this patent is extended or adjusted under 35 U.S.C. 154(b) by 136 days.

(21) Appl. No.: 16/070,735

(22) PCT Filed: Aug. 9, 2016

(86) PCT No.: PCT/CN2016/094165
§ 371 (c)(1),
(2) Date: Jul. 17, 2018

(87) PCT Pub. No.: WO2017/173754
PCT Pub. Date: Oct. 12, 2017

(65) Prior Publication Data
US 2019/0018766 A1    Jan. 17, 2019

(30) Foreign Application Priority Data
Apr. 6, 2016  (CN) .......................... 2016 1 0210095

(51) Int. Cl.
*G06F 12/02*   (2006.01)
*G06F 12/12*   (2016.01)
(Continued)

(52) U.S. Cl.
CPC ...... *G06F 12/0223* (2013.01); *G06F 12/0638* (2013.01); *G06F 12/123* (2013.01); *G06F 2212/1016* (2013.01)

(58) Field of Classification Search
None
See application file for complete search history.

(56) References Cited

U.S. PATENT DOCUMENTS

| 4,463,424 A | * | 7/1984 | Mattson | ............... G06F 12/123 711/136 |
| 5,394,537 A | * | 2/1995 | Courts | ................... G06F 12/08 711/202 |

(Continued)

FOREIGN PATENT DOCUMENTS

| CN | 101556565 A | 10/2009 |
| CN | 102103545 A | 6/2011 |
| CN | 103942161 A | 7/2014 |

OTHER PUBLICATIONS

Chen et al. (DianNao: A Small-Footprint High-Throughput Accelerator for Ubiquitous Machine-Learning; pp. 1-15). ACM 978-1-4503-2305-5 (Mar. 1-5, 2014) (Year: 2014).*

(Continued)

*Primary Examiner* — Kaushikkumar M Patel
(74) *Attorney, Agent, or Firm* — Maschoff Brennan (57) ABSTRACT

A method may include: partitioning data on an on-chip and/or an off-chip storage medium into different data blocks according to a pre-determined data partitioning principle, wherein data with a reuse distance less than a pre-determined distance threshold value is partitioned into the same data block; and a data indexing step for successively loading different data blocks to at least one on-chip processing unit according a pre-determined ordinal relation of a replacement policy, wherein the repeated data in a loaded data block being subjected to on-chip repetitive addressing. Data with (Continued)

a reuse distance less than a pre-determined distance threshold value is partitioned into the same data block, and the data partitioned into the same data block can be loaded on a chip once for storage, and is then used as many times as possible, so that the access is more efficient.

14 Claims, 5 Drawing Sheets

(51) Int. Cl.
  *G06F 12/06* (2006.01)
  *G06F 12/123* (2016.01)

(56) References Cited

U.S. PATENT DOCUMENTS

2004/0260517 A1* 12/2004 Ding .................... G06F 8/4442
                                                            702/186
2009/0177842 A1* 7/2009 Kulkarni ................ G06F 9/383
                                                            711/125
2014/0281280 A1* 9/2014 Goss ...................... G06F 3/067
                                                            711/148
2016/0062916 A1* 3/2016 Das ...................... G06F 12/128
                                                            711/133
2016/0232093 A1* 8/2016 Kim ................... G06F 12/0811

OTHER PUBLICATIONS

Issenin et al. (DRDU: A Data Reuse Analysis Technique for Efficient Scratch-Pad Memory Management, pp. 1-28). ACM 1084-4309/2007/04 (Year: 2007).*
Niu et al. (PARDA: A Fast Parallel Reuse Distance Analysis Algorithm. IEEE 1530-2075/12, pp. 1284-1294 (Year: 2012).*
International Search Report dated Jan. 12, 2017, in related PCT Application No. PCT/CN2016/094165, 4 pgs.

* cited by examiner

METHOD AND DEVICE FOR ON-CHIP REPETITIVE ADDRESSING

TECHNICAL FIELD

The present disclosure relates to a method and a device for on-chip repetitive addressing.

BACKGROUND

In the era of big data, more and more devices are required to perform more and more complex processing on real-time input in the real world, such as, industrial robots, automatic driving of unmanned car and mobile devices, etc. These tasks mostly pertain to the machine learning field, where most operations are vector operations or matrix operations, which have a high degree of parallelism. As compared to the traditional common GPU/CPU acceleration scheme, the hardware ASIC accelerator is the most popular acceleration scheme at present. On one hand, it can provide a high degree of parallelism and can achieve high performance, and on the other hand, it has high energy efficiency.

However, the bandwidth becomes a bottleneck that limits the performance of the accelerator, and the common solution is to balance disequilibrium of the bandwidth through a cache positioned on the chip. These common solutions do not optimize data reading and writing, and cannot better utilize characteristics of the data, such that the on-chip storage overhead is too much, and overhead of data reading and writing is too much. As for current common machine learning algorithms, most of the data have reusability, i.e., the same data will be used for many times, such that the data has the characteristics of repetitive addressing for many times, such as, a weight in the neural network.

In conclusion, the prior art obviously has inconvenience and defects in practical use, so it is necessary to make improvement.

SUMMARY

With respect to the above deficiencies, an object of the present disclosure is to provide a method and a device for on-chip repetitive addressing, wherein data is partitioned into data blocks according to a pre-determined data partitioning principle, and the data partitioned into the same data block can be loaded on a chip once for storage, and is then used as many times as possible, so that the access is more efficient.

In order to achieve the object, the present disclosure provides a method for on-chip repetitive addressing, comprising:

a data partitioning step for partitioning data on an on-chip storage medium and/or an off-chip storage medium into different data blocks according to a pre-determined data partitioning principle, wherein on the basis of the pre-determined data partitioning principle, the data with a reuse distance less than a pre-determined distance threshold value is partitioned into the same data block; and a data indexing step for successively loading the different data blocks to at least one on-chip processing unit according to a pre-determined ordinal relation of a replacement policy, wherein the repeated data in a loaded data block being subjected to on-chip repetitive addressing.

According to the method of the present disclosure, an index address for a data is consisted of a data block address and an in-block address;

the data indexing step comprises: successively loading different data blocks to the at least one on-chip processing unit according to the pre-determined ordinal relation of the replacement policy and the data block address, wherein the repeated data in the loaded data block being subjected to on-chip repetitive addressing, and when all indexing of the in-block address of the loaded data block are completed, a new data block is loaded until all of the data blocks have been loaded.

According to the method of the present disclosure, the on-chip storage medium exchanges data with the on-chip processing unit through an on-chip data path;

the on-chip storage medium exchanges data with the off-chip storage medium through an on-chip and off-chip data path, and the on-chip storage medium or the off-chip storage medium performs at least one reading and writing from inside or outside;

the data is carried between the on-chip storage medium, the off-chip storage medium and/or the on-chip processing unit in a unit of data block.

According to the method of the present disclosure, a data size of a data block is smaller than a capacity of the on-chip storage medium.

According to the method of the present disclosure, the on-chip storage medium adopts a design in which a read port is separated from a write port.

According to the method of the present disclosure, the method is applied to a learning accelerator.

According to the method of the present disclosure, the method is applied to a heterogeneous environment.

According to the method of the present disclosure, the on-chip processing unit is an on-chip operation module, a data is selected according to a pre-determined condition, and the data satisfying the pre-determined condition is partitioned into the same data block.

According to the method of the present disclosure, the pre-determined condition comprises a simple partitioning condition, a condition with an average pre-determined number of data blocks, a condition associated with different output neurons, or a condition satisfying a pre-determined mathematic relation.

According to the method of the present disclosure, the replacement policy comprises an ordinal replacement, a reversed replacement or an unordered replacement; or the replacement policy comprises data writing back, which writes a final result or an intermediate result back to the on-chip storage medium, the off-chip storage medium and/or the on-chip processing unit after the data is processed.

The present disclosure further provides a device with which the method for on-chip repetitive addressing is implemented, the device comprising:

a data partitioning module for partitioning data on an on-chip storage medium and/or an off-chip storage medium into different data blocks according to a pre-determined data partitioning principle, wherein on the basis of the data partitioning principle, the data with a reuse distance less than a pre-determined distance threshold value is partitioned into the same data block;

a data indexing module for successively loading different data blocks to at least one on-chip processing unit according to a pre-determined ordinal relation of a replacement policy, wherein repeated data in a loaded data block being subjected to on-chip repetitive addressing.

DETAILED DESCRIPTION

In order to make the object, the technical solution and the advantages of the present disclosure clearer, the present disclosure is further explained in detail with reference to the drawings and the examples. It shall be understood that the specific examples described here are only to explain the present disclosure, instead of limiting the present disclosure.

The present disclosure comprises a device for on-chip repetitive data addressing and a method of dispatching and using the device, and the object is to efficiently read and write the repetitive data, such that on-chip repetitive addressing can be effectively achieved, while supporting on-chip and off-chip data exchange, and by means of data and address partitioning, a space for the on-chip data repetitive addressing can be expanded to an off-chip address space. The present disclosure can reduce memory access bandwidth requirements while providing good flexibility, and hence reducing the on-chip storage overhead. Moreover, it can be adapted to different scenes, and it is not merely limited to machine learning accelerators.

Meanwhile, the present disclosure can cut on-chip cache overhead by reasonably dispatching data, so as to provide a support for the design of more efficient accelerator. Reasonably dispatching data not only refers to the data replacement policy, but also comprises partitioning calculation, and re-arranging the calculation order, such that centralized access data can be arranged in the same data block. The present disclosure utilizes on-chip repetitive addressing to reduce memory access bandwidth in the heterogeneous environment, and relates to carrying out and dispatching of the storage unit and the addressing unit.

Figure 1:
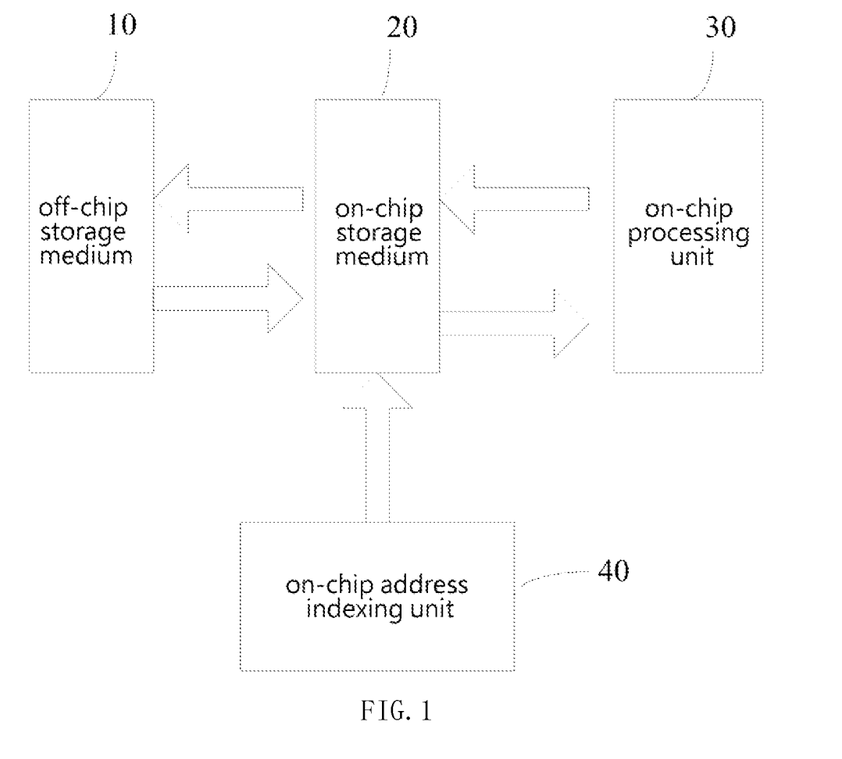
FIG. 1 is an illustrated block diagram of an overall structure of a preferable example of the device for on-chip repetitive addressing according to the present disclosure.

FIG. 1 is an illustrated block diagram of an overall structure of a preferable example. For example, as for a heterogeneous platform, the data which can be stored in an on-chip storage medium 20 of the accelerator is limited, and generally, limited resources on a chip limit the possibility of storing all data on the chip, so large storage medium (cheap, slow speed) is placed off the chip, small storage medium (expensive, fast speed) is integrated on the chip, and it is required to partition all data into data blocks that can be stored in the on-chip storage medium 20. The required data block is read or written through data interchange between an off-chip storage medium 10 having a large storage capacity and the on-chip storage medium 20 having a small storage capacity. During the time, an on-chip address indexing unit 40 provides an index address to an on-chip processing unit 30 as required from the on-chip processing unit 30. The storage medium of the present disclosure is not limited, which may be common storage medium, such as, a Static Random Access Memory (SRAM), a Dynamic Random Access Memory (DRAM), an Enhanced Dynamic Random Access Memory (eDRAM), a Register file (RF) and the like, and also may be novel storage device, such as, a Non-Volatile Memory (NVM), or a 3D storage device.

The present disclosure provides a method for on-chip repetitive addressing, which is a data management policy adopted when a data size is larger than the storage capacity of the on-chip storage medium 20. The off-chip data can be read into the chip for rapid repetitive addressing with the method, and off-chip repetitive addressing can also be achieved. However, the efficient method is to put centralized access data together, carry into the chip once, and then directly perform on-chip rapid addressing. The method comprises:

a data partitioning step for partitioning data on an on-chip storage medium and/or an off-chip storage medium into different data blocks according to a pre-determined data partitioning principle, wherein on the basis of the data partitioning principle, the data with a reuse distance less than a pre-determined distance threshold value is partitioned into the same data block. The reuse distance refers to the number of the different data between two consecutive accesses of the same data, and the data with a short reuse distance will be accessed in a short time of running, i.e., having a strong correlation in time. These data partitioned on the same data block can be loaded on a chip once for storage, and is then used as many times as possible, so that the memory access is more efficient. In each data block, the data is stored in the medium according to a pre-determined principle, such as, an ordinal storage; and a data indexing step for successively loading the different data blocks to at least one on-chip processing unit according a pre-determined ordinal relation of a replacement policy, wherein the repeated data in a loaded data block is subjected to on-chip repetitive addressing. The data in a data block may be subjected to direct repetitive addressing in the chip, which avoids storing off the chip, or several times of read and write (slow speed, high power consumption) of the IO. An effective data partitioning principle is used to make times of replacement as less as possible (the effective data partitioning principle may reduce replacement times, and on such basis, an effective data replacement policy may further reduce the replacement times).

Figure 2:
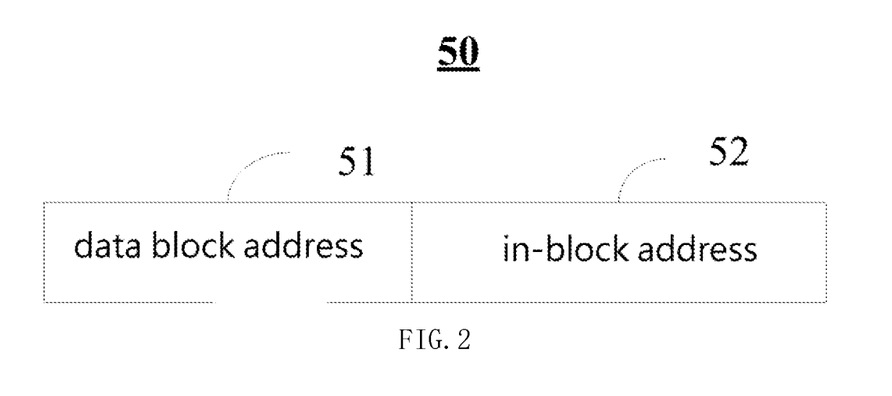
FIG. 2 is a data address partitioning diagram of a preferable example of the method for on-chip repetitive addressing according to the present disclosure.

Preferably, FIG. 2 illustrates a data address partitioning diagram. An index address 50 for each data comprises a data block address 51 and an in-block address 52, i.e., the address for each data is spliced by the current data block address 51 and the in-block address 52. After the data is partitioned into reasonable data blocks, the on-chip repetitive addressing is more efficient by partitioning the address into data block address and in-block addresses. The technology used by address indexing is not limited to simple data indexing, and also comprises partitioning solution of codebook, and the like.

The data indexing step comprises successively loading different data blocks to the at least one on-chip processing unit 30 according to the pre-determined ordinal relation of the replacement policy and the data block address 51, wherein the repeated data in a loaded data block is subjected to on-chip repetitive addressing, and when all indexing of the in-block address 52 of the loaded data block are completed, a new data block is loaded until all of the data blocks have been loaded. When data is partitioned into different data blocks according to a pre-determined data partitioning principle, although it is not necessary for the on-chip address indexing unit 40 to use the data block address 51, the data block address 51 still has to be recorded for subsequent use.

Preferably, the on-chip storage medium 20 exchanges data with the on-chip processing unit 30 through an on-chip data path; the on-chip storage medium 20 exchanges data with the off-chip storage medium 10 through an on-chip and off-chip data path, and the on-chip storage medium 20 or the off-chip storage medium 10 performs at least one reading and writing from inside or outside; the data is carried between the on-chip storage medium 20, the off-chip storage medium 10 and/or the on-chip processing unit 30 in a unit of data block.

Preferably, a data size of the data block is smaller than a capacity of the on-chip storage medium 20.

Preferably, the on-chip storage medium 20 adopts a design in which a read port is separated from a write port, such that read and write of the data are independent from each other, and can be performed simultaneously.

Preferably, the method is applied to a learning accelerator.

Preferably, the method is applied to a heterogeneous environment.

Preferably, the on-chip processing unit 30 is an on-chip operation module, a data is selected according to a pre-determined condition, and the data satisfying the pre-determined condition is partitioned into the same data block. Specifically, the pre-determined condition comprises a simple partitioning condition, a condition with an average pre-determined number of data blocks, a condition associated with different output neurons, or a condition satisfying a pre-determined mathematic relation. These are specific data partitioning principles under different circumstances, and they are still within the range defined by the data partitioning principle.

Figure 3:
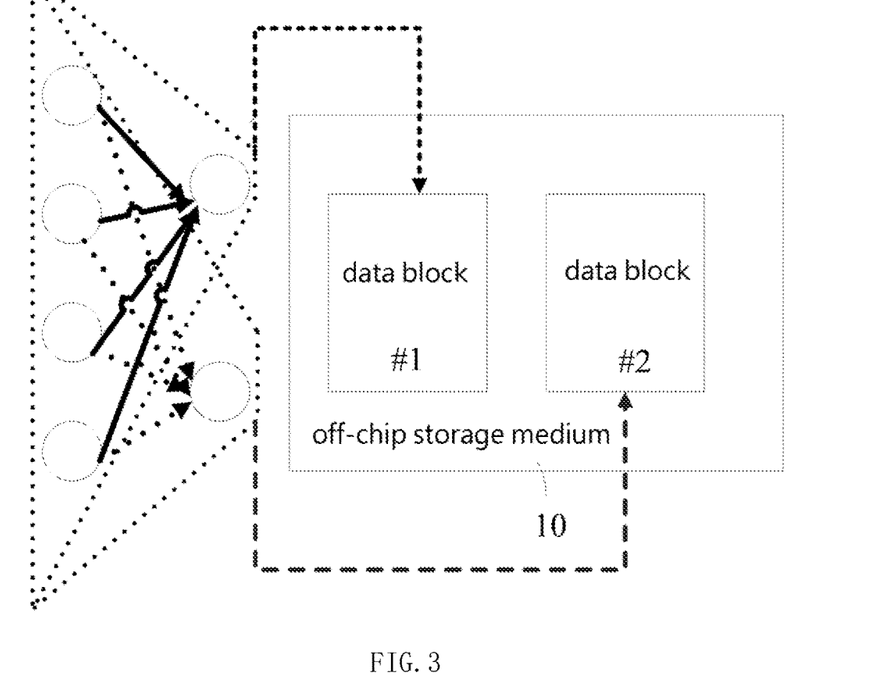
FIG. 3 is a schematic diagram of data partitioning of the preferable example of the method for on-chip repetitive addressing according to the present disclosure.

As illustrated in FIG. 3, it is a schematic diagram of data partitioning of one preferable example. Taking the common neural network for example (vector operation), weight data required for different output neurons are stored in different data blocks, and during operation, they are loaded to different data blocks at different times for indexing. Values of input neurons are reused, and the same input is used to calculate the two output neurons. When calculating the output neurons, the associated weight is loaded, and after calculation, this part of weight is completely not required; when calculating the output neurons, the associated weight is loaded, wherein values of the same input neuron is only stored for one portion, i.e., repetitive addressing is required in calculation. The same weight is also only stored for one portion, and is also obtained by repetitive addressing.

Figure 4:
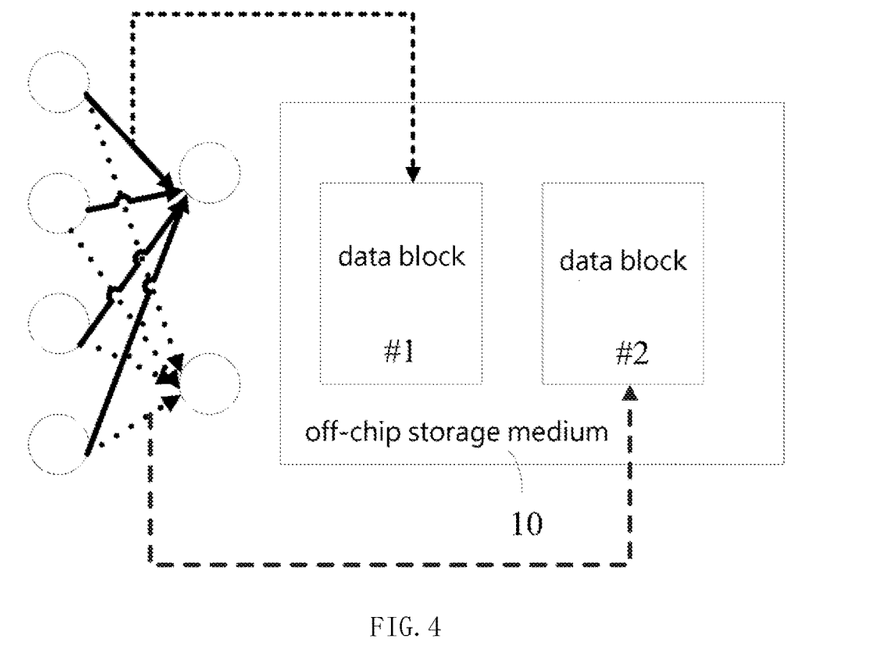
FIG. 4 is the other schematic diagram of data partitioning of the preferable example of the method for on-chip repetitive addressing according to the present disclosure.

As illustrated in FIG. 4, it is a schematic diagram of data partitioning of one preferable example. Similarly, taking the common neural network for example (vector operation), weight connection satisfying the specified condition is partitioned and stored in the same data block, such as, full line weight connection and imaginary line weight connection. At different times, different data blocks are loaded, and the calculation units select data according to the specified condition. For example, all output neurons first calculate associated calculation of the full line weight connection, and then calculate associated calculation of the imaginary line weight connection after replacement of the data block.

Figure 5:
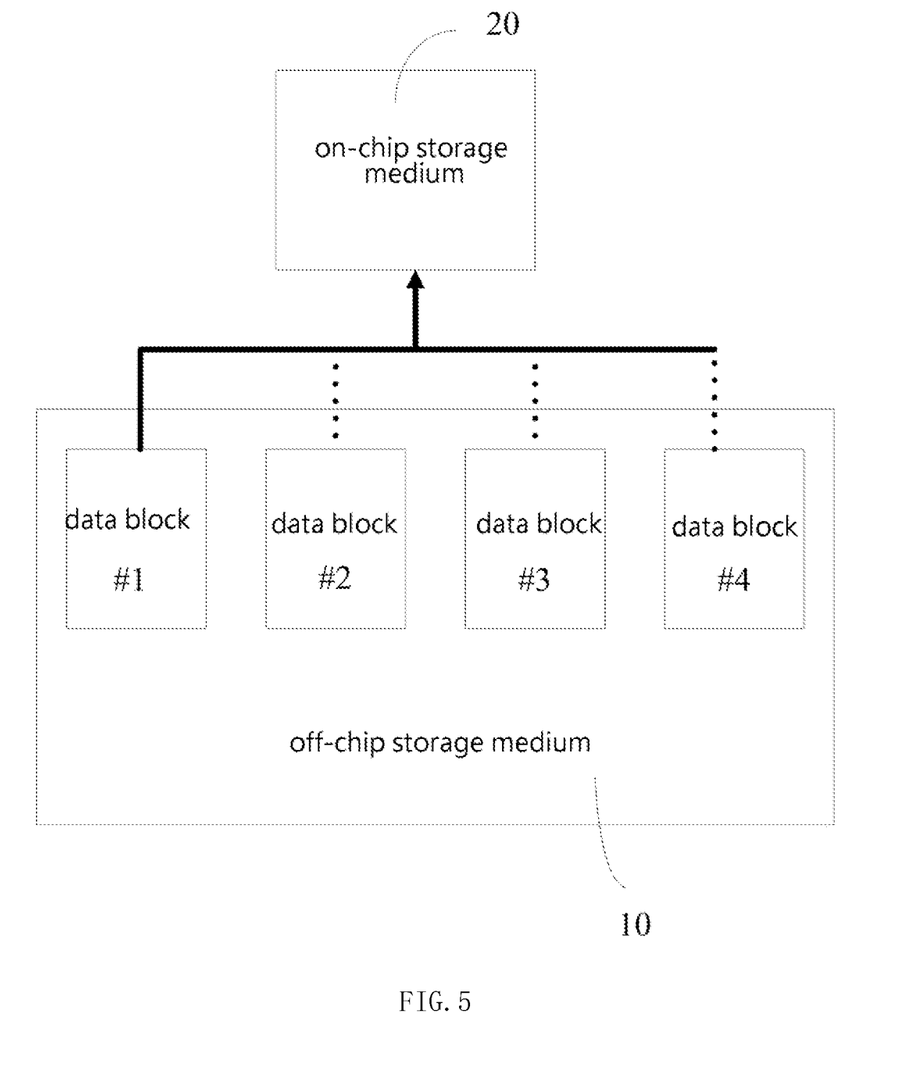
FIG. 5 is a schematic diagram of the replacement policy of the preferable example of the method for on-chip repetitive addressing according to the present disclosure.

Preferably, the replacement policy comprises an ordinal replacement, a reversed replacement or an unordered replacement. FIG. 5 illustrates a schematic diagram of the replacement policy of one preferable example. The data is partitioned into different data blocks, and at different times, different data blocks are loaded according to different replacement policies. For example, the ordinal replacement, the data blocks are loaded according to an order of #1, #2, #3 and so on; the reversed replacement, the data blocks are loaded according to an order of #N, #(N−1), #(N−2); the unordered replacement, the data blocks are read according to a specified order. Alternatively, the replacement policy comprises data writing back, which writes a final result or an intermediate result back to the on-chip storage medium, the off-chip storage medium and/or the on-chip processing unit after the data is processed. Different replacement policies shall consider consistency of the data.

The present disclosure further provides a device with which the method for on-chip repetitive addressing is implemented, the device comprising:

a data partitioning module for partitioning data on an on-chip storage medium and/or an off-chip storage medium into different data blocks according to a pre-determined data partitioning principle, wherein on the basis of the pre-determined data partitioning principle, the data with a reuse distance less than a pre-determined distance threshold value is partitioned into the same data block;

a data indexing module for successively loading the different data blocks to at least one on-chip processing unit according to a pre-determined ordinal relation of a replacement policy, wherein the repeated data in a loaded data block being subjected to on-chip repetitive addressing.

Preferably, an index address for the data is consisted of a data block address and an in-block address.

The data indexing module is used for successively loading the different data blocks to the at least one on-chip processing unit according to the pre-determined ordinal relation of the replacement policy and the data block address, wherein the repeated data in the loaded data block being subjected to on-chip repetitive addressing, and when all indexing of the in-block address of the data block are completed, a new data block is loaded until all of the data blocks have been loaded.

Preferably, the on-chip storage medium exchanges data with the on-chip processing unit through an on-chip data path;

the on-chip storage medium exchanges data with the off-chip storage medium through an on-chip and off-chip data path, and the on-chip storage medium or the off-chip storage medium performs at least one reading and writing from inside or outside;

the data is carried between the on-chip storage medium, the off-chip storage medium and/or the on-chip processing unit in a unit of data block.

Preferably, a data size of a data block is smaller than a capacity of the on-chip storage medium.

Preferably, the on-chip storage medium adopts a design in which a read port is separated from a write port.

Preferably, the device is applied to a learning accelerator.

Preferably, the device is applied to a heterogeneous environment.

Preferably, the on-chip processing unit is an on-chip operation module, a data is selected according to a pre-determined condition, and the data satisfying the pre-determined condition is partitioned into the same data block.

Preferably, the pre-determined condition comprises a simple partitioning condition, a condition with an average pre-determined number of data blocks, a condition associated with different output neurons, or a condition satisfying a pre-determined mathematic relation.

Preferably, the replacement policy comprises an ordinal replacement, a reversed replacement or an unordered replacement; or the replacement policy comprises data writing back, which writes a final result or an intermediate result back to the on-chip storage medium, the off-chip storage medium and/or the on-chip processing unit after the data is processed.

Figure 6:
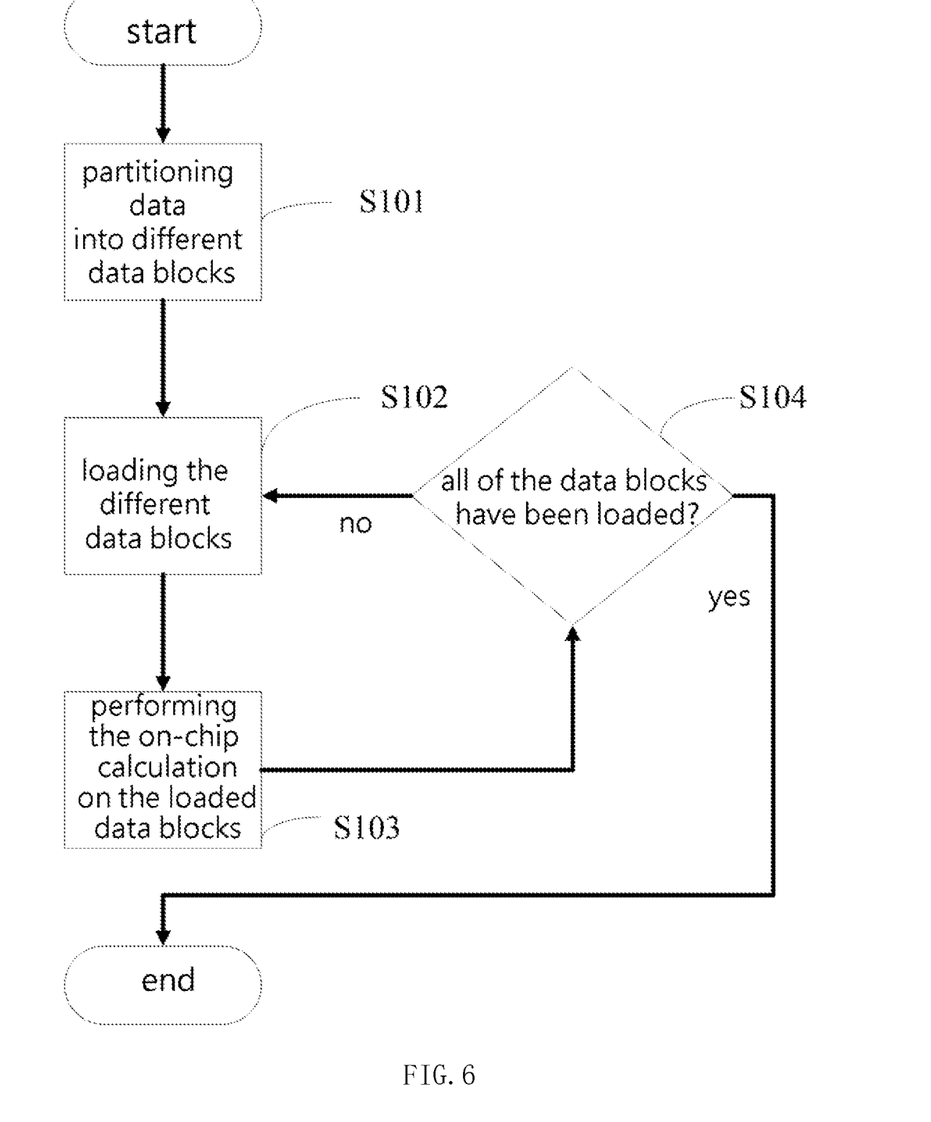
FIG. 6 is a flow chart of a specific example of the method for on-chip repetitive addressing according to the present disclosure.

FIG. 6 illustrates a flow chart used by the device which utilizes on-chip data repetitive addressing to reduce memory access bandwidth requirements of one preferable example. After starting to calculate, Step S101, partitioning data into different data blocks according to a pre-determined data partitioning principle.

Step S102, loading the different data blocks to the on-chip storage medium 20. At one time, only one data block is loaded to the on-chip storage medium 20 for on-chip calculation, and according to different replacement policies, different data blocks are loaded for calculation according to different orders.

Step S103, performing the on-chip calculation on the loaded data blocks.

Step S104, judging whether all calculations are completed, and all of the data blocks have been loaded, if yes, all calculations end, and otherwise, returning to the step S102.

Figure 7:
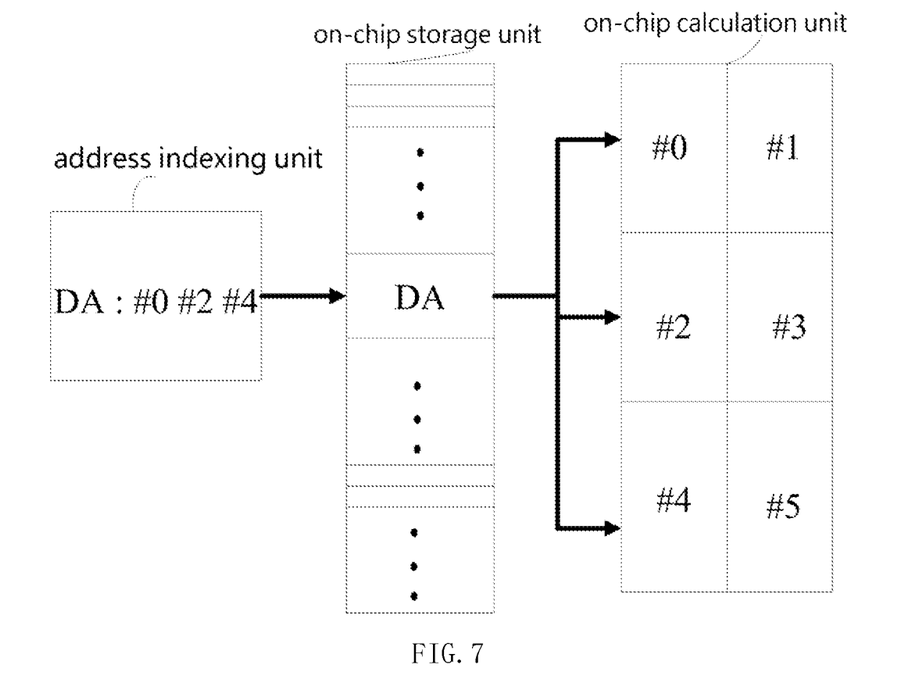
FIG. 7 is a schematic diagram of a preferable example of on-chip repetitive indexing of the method for on-chip repetitive addressing according to the present disclosure.

FIG. 7 illustrates a block diagram of repetitive addressing performed by calculation units according to addresses of one preferable example. According to the address indexing, the data stored at an address DA is required by the calculation units #0, #2, #4, the example is indexed to the address DA, and the data in the DA is propagated to the calculation units, i.e., #0, #2, #4. In this example, since the data required for the three calculation units are the same, they are only stored for one portion on the chip, i.e., the same data is performed repetitive addressing for three times. The way of transmitting the data to the on-chip calculation units in FIG. 7 is not limited to the connection way of BUS, and also comprises other connection ways of Crossbar structure, FAT-TREE, H-TREE and the like.

In conclusion, the present disclosure partitions data with a reuse distance less than a pre-determined distance threshold value into the same data block, wherein the reuse distance refers to the number of the different data between two consecutive accesses of the same data, and the data with a short reuse distance will be accessed in a short time of running, i.e., having a strong correlation in time. These data partitioned on the same data block can be loaded on a chip once for storage, and is then used as many times as possible, so that the memory access is more efficient. The present disclosure aims to utilize on-chip repetitive addressing to reduce memory access bandwidth. The method for on-chip repetitive addressing and the device for on-chip repetitive addressing according to the present disclosure can effectively provide the requirements of reusability of the data and flexible addressing, can be adapted to different scenes, and are not merely limited to machine learning accelerators.

Certainly, the present disclosure also may have other multiple examples, and without departing from the spirit and substance of the present disclosure, those skilled in the art shall make various corresponding modifications and variations according to the present disclosure, but these corresponding modifications and variations shall belong to the scope protected by the appended claims.

INDUSTRIAL APPLICABILITY

The present disclosure partitions data with a reuse distance less than a pre-determined distance threshold value into the same data block, wherein the reuse distance refers to the number of the different data between two consecutive accesses of the same data, and the data with a short reuse distance will be accessed in a short time of running, i.e., having a strong correlation in time. The data which is partitioned into the same data block can be loaded on a chip once for storage, and is then used as many times as possible, so that the memory access is more efficient.

What is claimed is:

1. An on-chip repetitive addressing method, comprising:
   a data partitioning step for partitioning data on an on-chip storage medium and/or an off-chip storage medium into different data blocks according to a pre-determined data partitioning principle, wherein the pre-determined data partition principle partitions the data with a reuse distance less than a pre-determined distance threshold value into same data block; and
   a data indexing step for successively loading the different data blocks to at least one on-chip processing unit according a pre-determined ordinal relation of a replacement policy, wherein the repeated data in a loaded data block being subjected to on-chip repetitive addressing;
   wherein an index address for a data is consisted of a data block address and an in-block address;
   the data indexing step comprises successively loading different data blocks to the at least one on-chip processing unit according to the pre-determined ordinal relation of the replacement policy and the data block address, wherein the repeated data in the loaded data block being subjected to on-chip repetitive addressing, and when all indexing of the in-block address of the data block are completed, a new data block is loaded until all of the data blocks have been load.

2. The on-chip repetitive addressing method according to claim 1, wherein the on-chip repetitive addressing method is applied to a learning accelerator; and/or
   the method is applied to a heterogeneous environment, and the heterogeneous environment is a multichip architecture including a CPU and a learning accelerator;
   the on-chip storage medium exchanges data with the on-chip processing unit through an on-chip data path;
   the on-chip storage medium exchanges data with the off-chip storage medium through a data path to connect the on-chip storage media and the off-chip storage media, and the on-chip storage medium or the off-chip storage medium performs at least one reading and writing from inside of the learning accelerator or outside of the learning accelerator;
   the data is carried between the on-chip storage medium, the off-chip storage medium and/or the on-chip processing unit in a unit of data block.

3. The on-chip repetitive addressing method according to claim 1, wherein a data size of a data block is smaller than a capacity of the on-chip storage medium.

4. The on-chip repetitive addressing method according to claim 1, wherein the on-chip storage medium adopts a design in which a read port is separated from a write port.

5. The on-chip repetitive addressing method according to claim 1, wherein the on-chip processing unit is an on-chip operation module, a data is selected according to a pre-determined condition, and the data satisfying the pre-determined condition is partitioned into the same data block.

6. The on-chip repetitive addressing method according to claim 5, wherein the pre-determined condition comprises a simple partitioning condition, a condition with an average pre-determined number of data blocks, a condition associated with different output neurons, or a condition satisfying a pre-determined mathematic relation.

7. The on-chip repetitive addressing method according to claim 5, wherein the replacement policy comprises an ordinal replacement, a reversed replacement or an unordered replacement; or
the replacement policy comprises data writing back, which writes a final result or an intermediate result back to the on-chip storage medium, the off-chip storage medium and/or the on-chip processing unit after the data is processed.

8. A device for on-chip repetitive addressing, the device comprising:
a data partitioning module for partitioning data on an on-chip storage medium and/or an off-chip storage medium into different data blocks according to a pre-determined data partitioning principle, wherein the pre-determined data partitioning principle partitions the data with a reuse distance less than a pre-determined distance threshold value into same data block;
a data indexing module for successively loading different data blocks to at least one on-chip processing unit according a pre-determined ordinal relation of a replacement policy, wherein the repeated data in a loaded data block being subjected to on-chip repetitive addressing;
wherein an index address for a data is consisted of a data block address and an in-block address;
the data indexing step comprises successively loading different data blocks to the at least one on-chip processing unit according to the pre-determined ordinal relation of the replacement policy and the data block address, wherein the repeated data in the loaded data block being subjected to on-chip repetitive addressing, and when all indexing of the in-block address of the data block are completed, a new data block is loaded until all of the data blocks have been loaded.

9. The device for on-chip repetitive addressing according to claim 8, wherein the method is applied to a learning accelerator; and/or the method is applied to a heterogeneous environment, and the heterogeneous environment is a multichip architecture including a CPU and a learning accelerator;
the on-chip storage medium exchanges data with the on-chip processing unit through an on-chip data path;
the on-chip storage medium exchanges data with the off-chip storage medium through a data path to connect the on-chip storage medium and the off-chip storage medium, and the on-chip storage medium or the off-chip storage medium performs at least one reading and writing from inside of the learning accelerator or outside of the learning accelerator;
the data is carried between the on-chip storage medium, the off-chip storage medium and/or the on-chip processing unit in a unit of data block.

10. The device for on-chip repetitive addressing according to claim 8, wherein a data size of a data block is smaller than a capacity of the on-chip storage medium.

11. The device for on-chip repetitive addressing according to claim 8, wherein the on-chip storage medium adopts a design in which a read port is separated from a write port.

12. The device for on-chip repetitive addressing according to claim 8, wherein the on-chip processing unit is an on-chip operation module, a data is selected according to a pre-determined condition, and the data satisfying the pre-determined condition is partitioned into the same data block.

13. The device for on-chip repetitive addressing according to claim 12, wherein the pre-determined condition comprises a simple partitioning condition, a condition with an average pre-determined number of data blocks, a condition associated with different output neurons, or a condition satisfying a pre-determined mathematic relation.

14. The device for on-chip repetitive addressing according to claim 13, wherein the replacement policy comprises an ordinal replacement, a reversed replacement or an unordered replacement; or
the replacement policy comprises data writing back, which writes a final result or an intermediate result back to the on-chip storage medium, the off-chip storage medium and/or the on-chip processing unit after the data is processed.

* * * * *